United States Patent [19]

Bisacquino et al.

[11] Patent Number: 4,528,590
[45] Date of Patent: Jul. 9, 1985

[54] ELECTRONIC TREADLE

[75] Inventors: Lenora A. Bisacquino, Middleburgh Hts.; Larry E. Dienes, North Ridgeville; Rudolph J. Plasko, Lorain, all of Ohio

[73] Assignee: Allied Corporation, Morristown, N.J.

[21] Appl. No.: 549,855

[22] Filed: Nov. 9, 1983

[51] Int. Cl.³ ............................................. H01C 10/12
[52] U.S. Cl. ................................... 338/153; 338/108; 338/47; 338/113; 74/512; 74/513
[58] Field of Search ............... 338/153, 108, 99, 47, 338/215, 113; 74/512, 513, 478, 89, 89.15, 89.19, 96, 99 R

[56] References Cited

U.S. PATENT DOCUMENTS 2,192,714 3/1940 Norman et al. .............. 338/153 X
2,908,883 10/1959 Anderson ..................... 338/108 X
4,290,042 9/1981 Sato .............................. 338/108 X Primary Examiner—Roy N. Envall, Jr.
Assistant Examiner—C. N. Sears
Attorney, Agent, or Firm—Ken C. Decker; William N. Antonis

[57] ABSTRACT

An electronic treadle (10) for generating an electrical signal proportioned to the degree of angular movement of a pivotally mounted treadle plate (14) includes a base (32) having side portions (26,28) which cooperate with corresponding side members (22,24) extending from the treadle plate. A pair of stops (76,78) are carried on one (26) of the side portions which cooperate with a tab (80) movable with the treadle plate (14) to limit the angular movement thereof. Movement of the treadle plate (14) is transmitted to a rotary potentiometer (66) carried on side portion (28) by a shaft (62) and socket (57) connecting the shaft to side member (22).

20 Claims, 3 Drawing Figures

ELECTRONIC TREADLE

BACKGROUND OF THE INVENTION

Automotive vehicles are normally controlled by an accelerator pedal or treadle which is connected to the fuel control apparatus on the vehicle engine by a mechanical linkage. However, modern engines are being increasingly equipped with electronic controls. These controls require an electronic signal instead of the mechanical signal provided by the prior art linkage. Accordingly, vehicles have been equipped with a potentiometer mounted in the engine compartment which is controlled by a mechanical linkage interconnecting the potentiometer with an accelerator pedal or treadle so that the potentiometer may be controlled to generate an electrical signal which varies in accordance with the angle of the accelerator treadle. Since the potentiometer must be located in the relatively harsh environment of the engine compartment of the vehicle and is exposed to ambient temperature, adverse road conditions, and engine vibration, potentiometers tend to deteriorate quickly and often are unable to function. Furthermore, the mechanical linkage necessary to interconnect the accelerator pedal with the potentiometer must be relatively complicated, and, accordingly, is relatively expensive and troublesome.

The present invention avoids the drawbacks of the prior art by providing an electronic accelerator treadle which uses a relatively small rotary potentiometer that is mounted on the treadle, so that the entire assembly may be located in the protected environment of the vehicle operator's compartment. Accordingly, not only is the potentiometer protected from environmental contaminants and engine vibration, but the linkage necessary to connect the accelerator pedal with the prior art potentiometer is eliminated and is replaced by a relatively simple rotary member. Location of the entire assembly within the operator's compartment also facilitates installation when the vehicle is assembled, and, accordingly, reduces costs.

SUMMARY OF THE INVENTION

Accordingly, the present invention comprises an electronic treadle for generating an electrical signal proportional to the degree of angular movement of a pivotally mounted treadle plate comprising a base, a treadle plate, means pivotally mounting the treadle plate on the base for pivotal movement about an axis, the base including connecting means for supporting the pivotally mounting means, a potentiometer mounted on the base, the potentiometer having an input rotatable about the axis, the potentiometer also being adapted to generate an output signal in response to rotation of the input, the magnitude of the output varying in response to the magnitude of the angular displacement of the input from a neutral position, means coupling the input rotation with the treadle plate as the latter rotates relative to the base from a neutral position corresponding to the neutral position of the input to the potentiometer, and resilient means yieldably urging the treadle to its neutral position.

BRIEF DESCRIPTION OF THE DRAWING

Other features and advantages of the invention will appear in the following description with reference to the accompanying drawing in which.

DESCRIPTION OF THE PREFERRED EMBODIMENT

Figure 1:
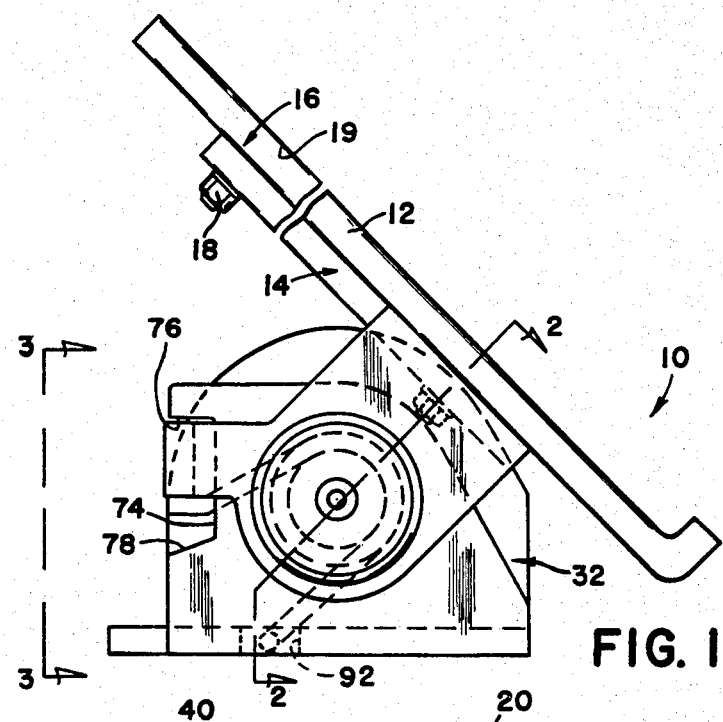
FIG. 1 is a side elevational view of an electronic treadle made pursuant to the teachings of our present invention.
Figure 2:
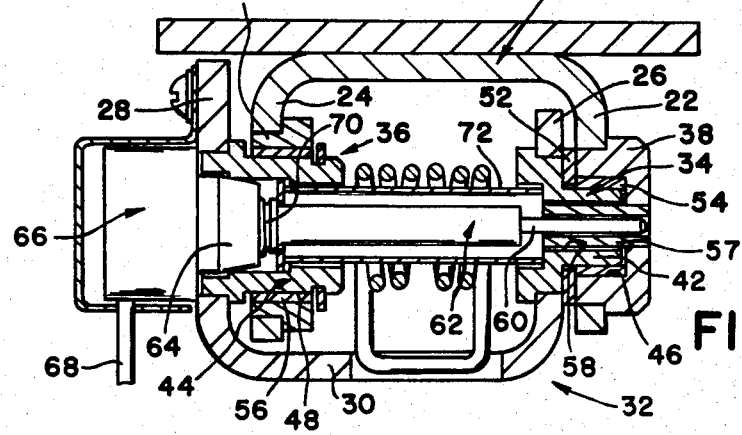
FIG. 2 is a cross-sectional view taken substantially along lines 2—2 of FIG. 1.
Figure 3:
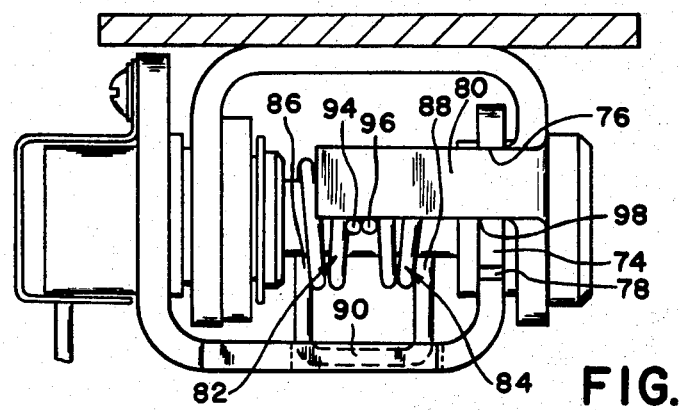
FIG. 3 is a view taken substantially along lines 3—3 of FIG. 1.

Referring now to the drawing, an electronic treadle generally indicated by the numeral 10 includes a treadle cover 12 and a treadle plate 14. The treadle cover 12 is fastened to the upper side 16 of the treadle plate 14 by bolts 18. The upper side 19 of the treadle cover 12 is adapted to receive the right foot of the vehicle operator when the electronic treadle 10 is used in an automotive vehicle to control the engine speed thereof. The treadle plate 14 includes a connecting portion 20 from which a pair of spaced parallel side members 22,24 extend. The side members 22,24 extend parallel with corresponding side portions 26,28 which extend respectively from opposite sides of a connecting portion 30 of a base generally indicated by the numeral 32. The connecting portion 30 of the base 32 is adapted for connection to, for example, the floorboard of the driver's compartment of the vehicle on which the electronic treadle 10 is mounted. Pivotally mounting means 34,36 pivotally interconnect each of the side members 22,24 with its corresponding side portion 26 or 28. Each of the pivotally mounting means 34,36 includes an annular member 38,40 which is secured to a corresponding side member 22 or 24, an annular projecting portion 42,44 which is carried by a corresponding side portion 26 or 28, the annular projecting portions 42,44 are received within corresponding aperatures 46,48 defined by the annular members 38,40. Pivotally mounting means 34,36 further include thrust bearing 52 and bearings 54 and 56 which provide a pivotal connection between the annular members 38,40 and the annular projecting portions 42,44 to thereby permit the treadle plate 14 to pivot relative to the base 32.

A socket 57 is force-fitted in the annular member 38 and projects through an aperture 58 defined within the annular projecting portion 42. The diameter of the socket 57 is less than the diameter of the aperture 58 so that the socket 57 can rotate relative to the aperture 58. The socket 57 slidably receives a reduced portion 60 of a shaft 62. The cross-section of the reduced portion 60 of the shaft 62 and the cross-section of the inner diameter of the socket 57 are complimentary and other than circular, so that when the end 60 of shaft 62 is installed within the socket 57, rotation of the socket 57 will rotate the shaft 62. The other end of the shaft 62 is received in an input 64 of a conventional rotary potentiometer 66 which is secured to the side portion 28. The rotary potentiometer 66 may be, for example, of the type manufactured by New England Instruments and is responsive to rotation of the input 64 to generate an electrical signal on the output lead 68 of the rotary potentiometer 66, the magnitude of which is directly proportional to the rotation of the input 64 from a base or neutral position. The rotary potentiometer 66 includes a spring (not shown) which returns the potentiometer 66 to the neutral or base position in case the shaft 62 should break. A V-shaped seal 70 protects the input 64 from environmental contaminants. A sleeve 72 extends between the projecting portions 42,44 and circumscribes the shaft 62, to protect the latter from environmental contaminants.

A groove 74 is provided in the side portion 26. The upper and lower ends of the groove 74 defined angularly spaced stops 76,78 which are adapted to be engaged by a projecting member or tab 80 which extends from the side member 22 at approximately a right angle thereto and extends toward the other side member 24. The tab 80 is received within the groove 74, so that the angular motion of the treadle plate 14 is limited by the engagement of the tab 80 with the upper stop 76 or with the lower stop 78. A pair of coiled torsion springs 82,84 are wrapped around the sleeve 72. The outer end coils 86,88 are connected together by U-shaped portion 90 which is received within an aperature 92 in the connecting portion 30 of the base 32 to thereby act as a stop for the springs. The other end portions 94,96 of the springs 82,84 extend from contiguous end coils of the springs and engage the lower side 98 of the tab 80. Accordingly, the springs 82,84 yieldably urge the tab 80 upwardly viewing the Figures, toward the stop 76, which defines the base or neutral position of the treadle plate 14 illustrated in FIG. 1. The springs 82,84 yield to permit pivoting of the treadle plate 14 with respect to the base 32.

In operation, the annular members 38,40, the socket 57, the shaft 62, and the input 64 of the potentiometer 66 are rotatable about the axis defined by the shaft 62. As discussed hereinabove, the tab 80 is integral with the treadle plate 14 and is yieldably urged into engagement with the stop 76 to thereby establish the base or neutral position of the treadle plate 14, which corresponds to the base or neutral position of the potentiometer 66. As the treadle plate 14 is rotated away from the base or neutral position, rotation of the treadle plate 14 is transmitted through annular member 38 to the socket 57 and from the socket 57 to the shaft 62. Rotation of the shaft 62 rotates the input 64 of the potentiometer 66. The potentiometer 66 responds to rotation of the input 64 to increase the magnitude of the signal on the output lead 68 of the potentiometer 66 in proportion to the degree of angular rotation of the shaft 62. Accordingly, the magnitude of the signal on the output lead 68 is increased from a minimal value when the tab 80 is engaged with the stop 76 to a maximum value when the tab 80 engages the stop 78. If the electronic treadle 10 is used as an accelerator pedal in a motor vehicle, the minimum value defined by engagement of tab 80 with the stop 76 corresponds to engine idle speed, and the maximum value of the electrical signal on the output lead 68 which corresponds to engagement of the tab 80 with the stop 78 corresponds to the "wide open throttle" (WOT) position in which maximum power is demanded from the vehicle engine.

It will be noted that the sleeve 72 and the projecting portions 42,44 and the seal 70 all serve to protect the potentiometer 66 from environmental contaminants. The redundancy provided by having separate interconnected springs 82,84 assure that the treadle plate 14 will be returned to the base or neutral position corresponding to engine idle conditions even if one of the springs 82,84 should break.

We claim:

1. Electronic treadle for generating an electrical signal proportional to the degree of angular movement of a pivotally mounted treadle plate comprising a base, a treadle plate, means pivotally mounting said treadle plate on said base for pivotal movement about an axis of rotation, said base including connecting means for supporting said pivotally mounting means, a rotary potentiometer mounted on said base and having an axis of rotation coaxial with the axis of rotation of said treadle plate, said potentiometer having an input rotatable about said axes of rotation, said potentiometer being adapted to generate an output signal in response to rotation of said input about said axes, the magnitude of said output signal varying in response to the magnitude of the angular displacement of said input from a neutral position, a drive shaft having an axis, said drive shaft being rotatable about its own axis and coupling said input of the potentiometer with the connecting means for coupling the input of the potentiometer for rotation with the pivotally mounting means as the latter rotates with the treadle plate relative to the base from a neutral position corresponding to the neutral position of said input of the potentiometer, and resilient means yieldably urging said treadle to its neutral position.

2. Electronic treadle as claimed in claim 1, wherein said connecting means include a pair of spaced-apart parallel side portions supporting said pivotally mounting means, said potentiometer being mounted on one of said side portions.

3. Electronic treadle as claimed in claim 2, wherein said connecting means further includes a pair of side members extending from said treadle plate, one of said members corresponding to said one side portion, the other side member corresponding to the other of said side portions, said pivotally mounting means interconnecting said side portions with the side members.

4. Electronic treadle as claimed in claim 3, wherein said pivotally mounting means are annular members defining aperatures, said annular members defining bearing surfaces for pivotally interconnecting the side members with the corresponding side portions, said shaft extending through said aperatures.

5. Electronic treadle as claimed in claim 3, wherein one of said side portion includes a pair of angularly spaced stops, and said treadle plate includes a projecting member engageable with said stops to limit the pivotal movement of the treadle plate with respect to said base to a predetermined arc.

6. Electronic treadle as claimed in claim 5, wherein said resilient means includes a torsion spring, said torsion spring including force-transmitting portions engaging said projecting member and said base respectively.

7. Electronic treadle as claimed in claim 6, wherein said resilient means comprises a pair of torsion springs, each of said torsion springs having a pair of ends, one end of each of said torsion spring being adjacent a corresponding end of the other spring, said adjacent ends of said spring bearing against said projecting member, said opposite ends of said springs being joined to one another and bearing against said base.

8. Electronic treadle as claimed in claim 1, wherein said connecting means include a pair of angularly spaced stops, and said treadle plate includes a projecting member engageable with said stops to limit pivotal movement of the treadle plate with respect to said base to a predetermined arc.

9. Electronic treadle as claimed in claim 8, wherein said resilient means includes a torsion spring, said torsion spring including force-transmitting portions engaging said projecting member and said base respectively.

10. Electronic treadle as claimed in claim 9, wherein said resilient means comprises a pair of torsion springs, ends of said torsion springs having a pair of ends, one end of each of said torsion spring being adjacent a corresponding end of the other spring, said adjacent ends of said spring bearing against said projecting member, said opposite ends of said springs being joined to one another and bearing against said base.

11. Electronic treadle as claimed in claim 8, wherein said coupling means is a shaft extending through the connecting means to couple the treadle plate for movement of the input of the potentiometer.

12. Electronic treadle for generating an electrical signal proportional to the degree of angular movement of a pivotally mounted treadle plate comprising a base, a treadle plate, means pivotally mounting said treadle plate on said base for pivotal movement about an axis, said base including connecting means for supporting said pivotally mounting means, a potentiometer mounted on said base, said potentiometer having an input rotatable about said axis, said potentiometer being adapted to generate an output signal in response to rotation of said input, the magnitude of said output signal varying in response to the magnitude of the angular displacement of said input from a neutral position, means coupling said input for rotation with the treadle plate as the latter rotates relative to the base from a neutral position corresponding to the neutral position of said input of the potentiometer, and resilient means yieldably urging said treadle to its neutral position, said resilient means comprising a pair of torsion springs, each of said torsion springs having a pair of ends, one end of each of said torsion spring being adjacent a corresponding end of the other spring, said adjacent ends of said springs bearing against said projecting member, said opposite ends of said springs being joined to one another and bearing against said base.

13. Electronic treadle as claimed in claim 12, wherein said connecting means includes a pair of spaced-apart parallel side portions supporting said pivotally mounting means, said potentiometer being mounted on one of said side portions.

14. Electronic treadle as claimed in claim 13, wherein said connecting means further includes a pair of side members extending from said treadle plate, one of said members corresponding to said one side portion, the other side member corresponding to the other of said side portions, said pivotally mounting means interconnecting said side portions with the side members.

15. Electronic treadle as claimed claim 14, wherein said coupling means is a shaft extending from the other side member to the said input of the potentiometer.

16. Electronic treadle as claimed in claim 15, wherein said pivotally mounting means are annular members defining apertures, said annular members defining bearing surfaces for pivotally interconnecting the side members with the corresponding side portions, said shaft extending through said apertures.

17. Electronic treadle as claimed in claim 16, wherein one of said side portions includes a pair of angularly spaced stops, and said treadle plate includes a projecting member engageable with said stops to limit the pivotal movement of the treadle plate with respect to said base to a predetermined arc.

18. Electronic treadle for generating an electrical signal proportional to the degree of angular movement of a pivotally mounted treadle plate comprising a base, a treadle plate, means pivotally mounting said treadle plate on said base for pivotal movement about an axis, said base including connecting means for supporting said pivotally mounting means, a potentiometer mounted on said base, said potentiometer having an input rotatable about said axis, said potentiometer being adapted to generate an output signal in response to rotation of said input, the magnitude of said output signal varying in response to the magnitude of the angular displacement of said input from a neutral position, means coupling said input for rotation with the treadle plate as the latter rotates relative to the base from a neutral position corresponding to the neutral position of said input of the potentiometer, resilient means yieldably urging said treadle to its neutral position, said connecting means including a pair of spaced-apart parallel side portions supporting said pivotally mounting means, said potentiometer being mounted on one of said side portions, and a pair of side members extending from said treadle plate, one of said members corresponding to said one side portion, the other side member corresponding to the other of said side portions, said pivotally mounting means interconnecting said side portions with the side members, one of said side portions including a pair of angularly spaced stops, said treadle plate including a projecting member engageable with said stops to limit the pivotal movement of the treadle plate with respect to said base to a predetermined arc.

19. Electronic treadle as claimed in claim 18, wherein said resilient means includes a torsion spring, said torsion spring including force-transmitting portions engaging said projecting member and said base respectively.

20. Electronic treadle as claimed in claim 19, wherein said resilient means comprises a pair of torsion springs, each of said torsion springs having a pair of ends, one end of each of said torsion spring being adjacent a corresponding end of the other spring, said adjacent ends of said spring bearing against said projecting member, said opposite ends of said springs being joined to one another and bearing against said base.

* * * * *